United States Patent
Yu et al.

(10) Patent No.: US 12,488,220 B2
(45) Date of Patent: Dec. 2, 2025

(54) DATA PROCESSING METHOD AND DEVICE, AND COMPUTER-READABLE STORAGE MEDIUM

(71) Applicant: ZTE Corporation, Shenzhen (CN)

(72) Inventors: Jinqing Yu, Shenzhen (CN); Minchao Liang, Shenzhen (CN); Shengnan Yan, Shenzhen (CN); Jie Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 1185 days.

(21) Appl. No.: 17/286,545

(22) PCT Filed: Sep. 27, 2019

(86) PCT No.: PCT/CN2019/108580
§ 371 (c)(1),
(2) Date: Apr. 19, 2021

(87) PCT Pub. No.: WO2020/078200
PCT Pub. Date: Apr. 23, 2020

(65) Prior Publication Data
US 2021/0390398 A1    Dec. 16, 2021

(30) Foreign Application Priority Data

Oct. 19, 2018   (CN) .......................... 201811223953.9

(51) Int. Cl.
*G06N 3/045* (2023.01)
*G06F 18/21* (2023.01)
(Continued)

(52) U.S. Cl.
CPC ......... *G06N 3/045* (2023.01); *G06F 18/2137* (2023.01); *G06F 18/217* (2023.01);
(Continued)

(58) Field of Classification Search
CPC .......... G06N 3/045; G06N 3/04; G06N 3/063; G06N 3/08; G06F 18/217; G06F 18/24765; G06F 18/2137
(Continued)

(56) References Cited

U.S. PATENT DOCUMENTS

| | | | |
|---|---|---|---|
| 10,678,894 B2 * | 6/2020 | Yin | H04W 12/06 |
| 2009/0177450 A1 * | 7/2009 | Gray | G16B 40/00 |
| | | | 703/2 |
| 2017/0039470 A1 | 2/2017 | Hirayama | |

FOREIGN PATENT DOCUMENTS

| | | |
|---|---|---|
| CN | 106214123 A | 12/2016 |
| CN | 106529670 A | 3/2017 |

(Continued)

OTHER PUBLICATIONS

Amiri, et al., "Multi-Precision Convolution Neural Networks on Heterogeneous Hardware", 2018 Date, 2018 (Year: 2018).*

(Continued)

*Primary Examiner* — Tsu-Chang Lee
(74) *Attorney, Agent, or Firm* — CANTOR COLBURN LLP

(57) ABSTRACT

Provided are a data processing method and device, and a computer-readable storage medium. The data processing method includes: acquiring at least one type of weights and feature data corresponding to each type of the weights; acquiring, according to the at least one type of weights, a classification feature corresponding to each type of the weights; performing calculation according to the at least one type of weights and the feature data corresponding to each type of the weights to obtain a first processing result corresponding to each type of the weights; and performing calculation according to the classification feature and the first processing result corresponding to each type of the (Continued)

weights corresponding to each type of the weights to obtain a second processing result.

15 Claims, 9 Drawing Sheets

(51) Int. Cl.
    *G06F 18/2137*    (2023.01)
    *G06F 18/24*       (2023.01)
    *G06N 3/04*       (2023.01)
    *G06N 3/063*      (2023.01)
    *G06N 3/08*       (2023.01)

(52) U.S. Cl.
    CPC ......... *G06F 18/24765* (2023.01); *G06N 3/04* (2013.01); *G06N 3/063* (2013.01); *G06N 3/08* (2013.01)

(58) Field of Classification Search
    USPC .......................................................... 706/25
    See application file for complete search history.

(56) References Cited

FOREIGN PATENT DOCUMENTS

| CN | 106651001 A | 5/2017 |
|---|---|---|
| CN | 107563279 A | 1/2018 |
| CN | 107633295 A | 1/2018 |
| CN | 107895190 A | 4/2018 |
| CN | 108288093 A | 7/2018 |
| CN | 108304928 A | 7/2018 |
| JP | H0451386 A | 2/1992 |
| JP | 2001175636 A | 6/2001 |
| JP | 2015501039 A | 1/2015 |

OTHER PUBLICATIONS

International Search Report for corresponding application PCT/CN2019/108580 filed Sep. 27, 2019; Mail date Dec. 27, 2019.
Takahiro Utsunomiya, "CNN implementation of FPGA with Power of 2 Approximation of Weight", The institute of Electronics, 2017.
Wang Hui, et al. "Selection of Multi-Indicator Comprehensive Evaluation Method and Weight Coefficients", Journal of Guangdong College of Pharmacy, vol. 23 No. 5, Oct. 2007.
Cheung C., "Magnified Gradient Function with Determistic Weight Modification in Adaptive Learning", IEE Transactions on Networks, IEE Service Center, Piscataway NJ, vol. 15, No. 6, Nov. 1, 2004, pp. 1411-1423, XP011121504.
European Search Report for corresponding EP19873082; Mail date May 13, 2022.
Naotake Kamiura, "An Improvement in Weight-Fault Tolerence of Feedforward Neural Networks", Aisian Test Symposium, Proccedings 10th Kyoto, Japan 19-21m Nov. 19, 2001, XP0110583639.

\* cited by examiner

DATA PROCESSING METHOD AND DEVICE, AND COMPUTER-READABLE STORAGE MEDIUM

CROSS REFERENCE

The present application is a National Stage Filing of the PCT International Application No. PCT/CN2019/108580 filed on Sep. 27, 2019, which claims priority to the Chinese Application No. 201811223953.9 entitled "Data Processing Method and Device, and Computer-Readable Storage Medium" and filed on Oct. 19, 2018, the entirety of which is herein incorporated by reference.

TECHNICAL FIELD

The present disclosure relates to the technical field of artificial intelligence neural networks, and in particular, to a data processing method and device, and a computer-readable storage medium.

BACKGROUND

A deep neural network (DNN) is an artificial neural network. Deep learning is substantively to learn more useful features based on massive training data by constructing a machine learning model having many hidden layers, thereby finally improving the accuracy of classification or prediction. The deep neural network has wide applications in the fields of speech analysis and image recognition.

With the continuous development of the deep learning technology, the calculation amount of the deep neural network is also increasing, and therefore, how to effectively reduce the calculation amount of the deep neural network is the problem to be solved urgently at present.

SUMMARY

Embodiments of the present disclosure provide a data processing method and device, and a computer-readable storage medium, which can reduce the calculation amount of a neural network.

The embodiments of the present disclosure are implemented as follows.

According to a first aspect, the embodiments of the present disclosure provide a data processing method. The data processing method includes: acquiring at least one type of weights and feature data corresponding to each type of the weights; acquiring a classification feature corresponding to each type of the weights according to the at least one type of weights; performing calculation according to the at least one type of weights and the feature data corresponding to each type of the weights to obtain a first processing result corresponding to each type of the weights; and performing calculation according to the classification feature and the first processing result corresponding to each type of the weights to obtain a second processing result.

In the embodiments, before acquiring the at least one type of weights, the data processing method may further include: acquiring historical weights; screening the historical weights according to a set screening condition to obtain screened weights; and classifying the screened weights according to a set classification rule to obtain the at least one type of weights.

In the embodiments, performing calculation according to the at least one type of weights and the feature data corresponding to each type of the weights to obtain the first processing result corresponding to each type of the weights may include: acquiring classification data corresponding to the feature data according to the at least one type of weights and the classification feature corresponding to each type of the weights; and performing calculation on the feature data according to the classification data to obtain the first processing result corresponding to each type of the weights.

In the embodiments, performing calculation according to the classification feature and the first processing result corresponding to each type of the weights to obtain the second processing result may include: sorting first processing results corresponding to respective types of weights according to a set sorting rule to obtain sorted first processing results; according to an sorting order, sequentially selecting from the sorted first processing results a first processing result to be processed; performing calculation according to the classification feature and the first processing result to be processed to obtain a first calculation result; performing calculation on the currently obtained first calculation result and a previously obtained first calculation result to obtain a second calculation result; and determining, in a case where it is determined that the second calculation result is a negative number, the second calculation result as the second processing result.

In the embodiments, after performing calculation according to the classification feature and the first processing result corresponding to each type of the weights to obtain the second processing result, the data processing method may further include: acquiring a first dimension of the feature data and a corresponding network dimension; acquiring a second dimension of the second processing result; adjusting, in a case where it is determined that the second dimension is lower than the first dimension, a current network dimension corresponding to the second processing result according to the acquired network dimension and a predetermined threshold range; acquiring a weight corresponding to the second processing result; and performing calculation on the second processing result based on the current network dimension and the weight corresponding to the second processing result to obtain a third processing result.

In the embodiments, adjusting, in a case where it is determined that the second dimension is lower than the first dimension, the current network dimension corresponding to the second processing result according to the acquired network dimension and the predetermined threshold range may include: performing, in a case where it is determined that the second dimension is lower than the first dimension, a modulus operation on the network dimension and a target network dimension for adjustment to obtain a modulus result; calculating a ratio according to the modulus result and the target network dimension for adjustment; and determining, in a case where the ratio is within a predetermined threshold range, the target network dimension for adjustment as the current network dimension corresponding to the second processing result.

In the embodiments, performing calculation on the feature data according to the classification data to obtain the first processing result corresponding to each type of the weights may include: performing a left shift calculation on the feature data according to the classification data to obtain the first processing result corresponding to each type of the weights. Correspondingly, performing calculation according to the classification feature and the first processing result corresponding to each type of the weights to obtain the second processing result may include: performing multiply-add calculation according to the classification feature and the first processing result corresponding to each type of the weights to obtain the second processing result.

According to a second aspect, the embodiments of the present disclosure provide a data processing device. The data processing device includes: a first acquisition module, configured to acquire at least one type of weights and feature data corresponding to each type of the weights; a second acquisition module, configured to acquire a classification feature corresponding to each type of the weights according to the at least one type of weights; a first obtaining module, configured to perform calculation according to the at least one type of weights and the feature data corresponding to each type of the weights to obtain a first processing result corresponding to each type of the weights; and a second obtaining module, configured to perform calculation according to the classification feature and the first processing result corresponding to each type of the weights to obtain a second processing result.

According to a third aspect, the embodiments of the present disclosure provide a data processing device. The data processing device includes a processor, a memory storing an instruction that is able to be executed by the processor, and a bus for connecting the processor and the memory. The processor, when executing the instruction, implements the data processing method.

According to a fourth aspect, the embodiments of the present disclosure provide a computer-readable storage medium, on which a data processing program is stored. The data processing program, when being executed by the processor, causes the processor to implement the data processing method.

DETAILED DESCRIPTION OF THE EMBODIMENTS

The embodiments of the present disclosure will be described in a clearly and fully understandable way in connection with the drawings related to embodiments of the present disclosure.

Embodiment I

Figure 1:
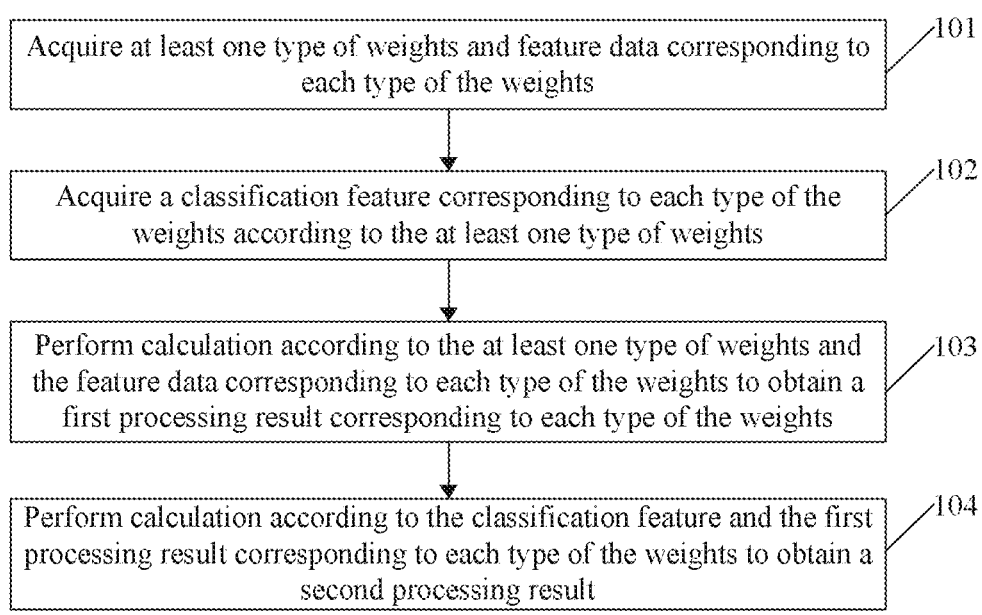
FIG. 1 is a schematic diagram I of an implementation procedure of a data processing method according to the embodiments of the present disclosure.

The embodiments of the present disclosure provide a data processing method. FIG. 1 is a schematic diagram I of an implementation procedure of a data processing method according to the embodiments of the present disclosure. As shown in FIG. 1, in the embodiments of the present disclosure, the data processing method may include operations 101 to 104.

In operation 101, at least one type of weights and feature data corresponding to each type of the weights are acquired.

In the embodiments of the present disclosure, before calculation is performed on feature data and weights, at least one type of weights and feature data corresponding to each type of the weights need to be acquired.

It should be noted that, the at least one type of weights acquired are classified weights obtained after weights are processed in advance according to a screening condition and a classification rule. Furthermore, each weight respectively corresponds to corresponding feature data. Various weight indicators, location index information corresponding to the weights, and feature data corresponding to the respective types of weights are stored in the storage unit in advance. The weight indicator is used for identifying a weight. The location index information corresponding to the weight is used for identifying a storage location of the feature data. That is, the weight indicator corresponds to a weight, and the weight corresponds to the location index information. Therefore, the weight indicator corresponds to the location index information. Here, the weight indicator and the corresponding location index information are sequentially read from the storage unit, the weight is restored by using the weight indicator, the feature data of the corresponding location (i.e., the feature data corresponding to the weight) is indexed by using the location index information, and convolution operation is performed on the weight and the feature data. This procedure is repeated in the same manner so as to complete all convolution operations.

For example, the screening condition may be removing weights equal to a set threshold and retaining weights not equal to the set threshold. For example, if the threshold is 0, the screening condition may be removing weights of which the values are 0, and retaining weights of which the values are not 0. The classification rule above may be that the weights, of which the values are positive numbers and negative numbers having the same absolute value, are classified into one type, and then the weights of various types are classified in a manner of multiplying a common factor by a power of 2. Alternatively, the classification rule above may be that weights of which the values are positive numbers are classified into one type and weights of which the values are negative numbers are classified into another type, and then the weights of various types are classified in a manner of multiplying a common factor by a power of 2. Alternatively, the classification rule above may be that the weights are directly classified in a manner of multiplying a common factor by a power of 2. For example, weights, of which the values are 1, 3, 4, and 6 can be converted into $1=1*2^0$, $3=3*2^0$, $4=1*2^2$, and $6=3*2^1$ in a manner of multiplying a common factor by a power of 2, after the common factor is extracted, weights 3 and 6 having the common factor 3 may be classified into one type, and weights 1 and 4 having the common factor 1 may be divided into another type. The screening condition and classification rule are not limited in the embodiments of the present disclosure.

In operation 102, a classification feature corresponding to each type of the weights is acquired according to the at least one type of weights.

In the embodiments of the present disclosure, after the at least one type of weights is acquired, a classification feature corresponding to each type of the weights may further be acquired according to the at least one type of weights.

It should be noted that, the classification feature corresponding to each type of the weights can be obtained during classifying the weights. For example, weights, of which the values are 1, 3, 4, and 6, can be converted into $1=1*2^0$, $3=3*2^0$, $4=1*2^2$, and $6=3*2^1$ in a manner of multiplying a common factor by a power of 2, and thus, weights having a common factor 3 can be classified into one type, and the common factor 3 corresponding to such weights 3 and 6 is a classification feature corresponding to such weights; and weights having a common factor 1 can be classified into another type, and the common factor 1 corresponding to such weights 1 and 4 is a classification feature corresponding to such weights.

In operation 103, calculation is performed according to the at least one type of weights and the feature data corresponding to each type of the weights to obtain a first processing result corresponding to each type of the weights.

In the embodiments of the present disclosure, after weights and feature data are obtained, classification features may be obtained according to the weights, then calculation is performed according to the classification features and the weights to obtain classification data corresponding to the feature data, and then an adding operation can be performed on the feature data according to the classification data to obtain the first processing result corresponding to each type of the weights.

For example, the values of one type of weights are 1 and 4 respectively, the feature data corresponding to the weight 1 is 1, and the feature data corresponding to the weight 4 is 2; the weight values of another type of weights are 6 and −12 respectively, the feature data corresponding to the weight 6 is 3, and the feature data corresponding to the weight −12 is 4. The weights can be converted into $1=1*2^0$, $4=1*2^2$, $6=3*2^1$ and $12=3*2^2$ in a manner of multiplying a common factor by a power of 2. The classification feature, i.e., the common factor, corresponding to the weights 1 and 4 is 1, the classification data, i.e., the exponent in the power of 2, corresponding to the weights 1 and 4 is 0 and 2 respectively; the classification feature, i.e., the common factor, corresponding to the weights 6 and −12 is 3, and the classification data, i.e., the exponent in the power of 2, corresponding to the weights 6 and −12 is 1 and 2, respectively.

It can be seen from the description above that, in a case where an adding operation is performed on the feature data according to the classification data to obtain first processing results corresponding to various weights, the calculation in the example may be as follows: the first processing result corresponding to one type of weights 1 and 4 is $(1<0)+(2<2)=1+8=9$; and the first processing result corresponding to another type of weights 6 and −12 is $(3<1)-(4<2)=6-16=-10$.

It should be noted that, the calculation corresponding to the weight having a negative numerical value is adding a negative number, i.e., subtraction.

In the embodiments of the present disclosure, the classification feature obtained in operation 102 and the first processing result obtained in operation 103 are used in operation 104 for obtaining the second processing result by means of calculation according to operation 102 and operation 103. Therefore, operation 103 may also be executed before operation 102, and the execution order of operation 102 and operation 103 is not specifically limited in the embodiments of the present disclosure.

In operation 104, calculation is performed according to the classification feature and the first processing result corresponding to each type of the weights to obtain a second processing result.

In the embodiments of the present disclosure, after the classification feature and the first processing result are obtained, multiply-add calculation is performed according to the classification feature and the first processing result corresponding to each type of the weights to obtain the second processing result.

For example, weights 1, −12, 4, and 6 are classified according to the manner of multiplying a common factor by a power of 2, in this way, weights 1 and 4 are classified into one type, and weights 6 and −12 are classified into another type. The first processing result corresponding to the weights 1 and 4 is 9, and the corresponding classification feature of the weights 1 and 4 is 1. The first processing result corresponding to the weights 6 and −12 is −10, and the corresponding classification feature of the weights 6 and −12 is 3, then the second processing result is $9*1+(-10)*3=-21$.

Figure 2:
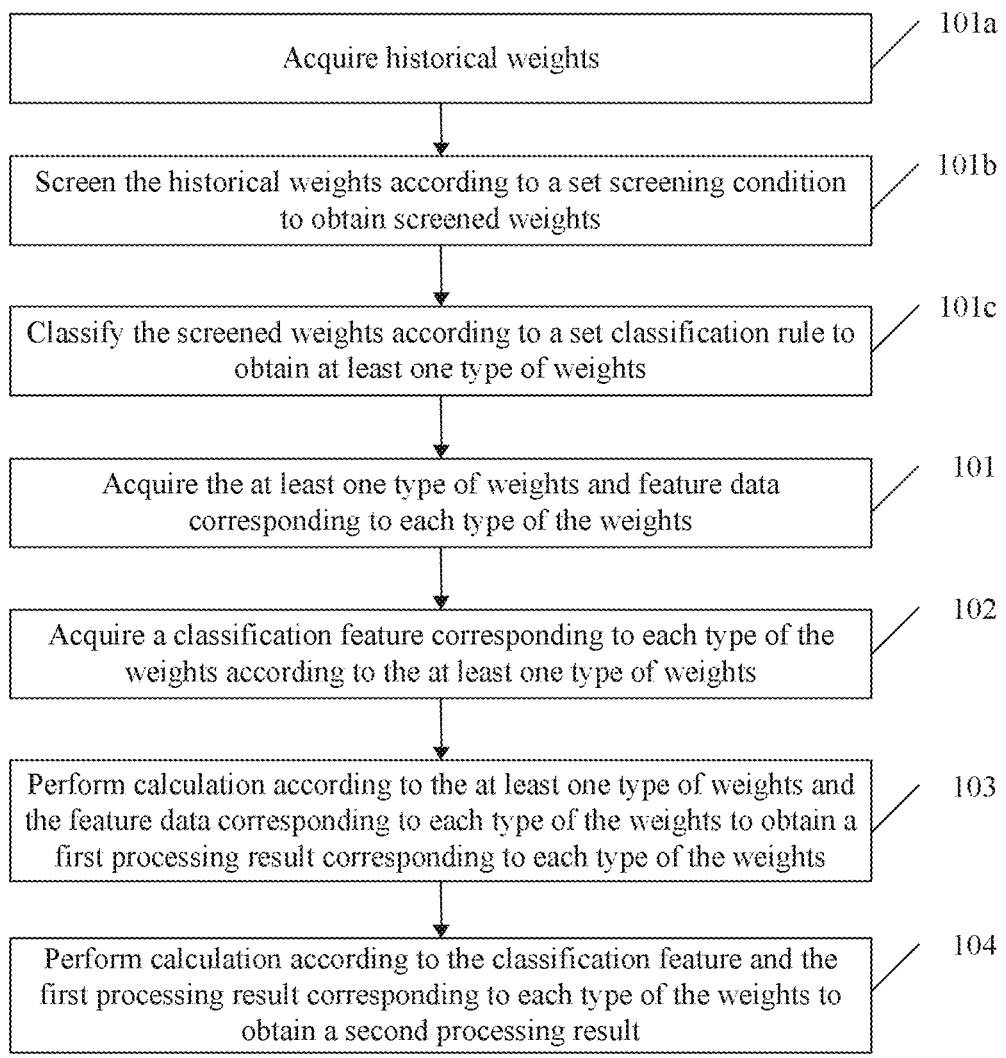
FIG. 2 is a schematic diagram II of an implementation procedure of a data processing method according to the embodiments of the present disclosure.

FIG. 2 is a schematic diagram II of an implementation procedure of a data processing method according to the embodiments of the present disclosure. As shown in FIG. 2, in the embodiments of the present disclosure, before the at least one type of weights is acquired, that is, before operation 101, the data processing method may further include operations 101*a* to 101*c*.

In operation 101*a*, historical weights are acquired.

In the embodiments of the present disclosure, sufficient sample data is collected, and the sample data is trained according to a preset model, such as a back propagation algorithm of an artificial neural network, so as to obtain historical weights.

In operation 101*b*, historical weights are screened according to a screening condition to obtain screened weights.

In the embodiments of the present disclosure, in order to support a sparse operation of a neural network, historical weights may be screened according to a set screening condition to obtain screened weights.

For example, the screening condition above may be deleting weights of which the values are 0, and retaining weights of which the values are not 0, that is, only weights of which the values are not 0 are stored, and there is no need to store and calculate the weights of which the values are 0, so that not only a storage bandwidth is reduced, but also a calculation amount is reduced, thereby supporting a sparse operation of a neural network.

In operation 101c, the screened weights are classified according to a set classification rule to obtain at least one type of weights.

In the embodiments of the present disclosure, after screened weights are obtained, the screened weights may also be classified according to a classification rule to obtain at least one type of weights. The classification rule may be that weights, of which the values are positive numbers and negative numbers having the same absolute value, are classified into one type, and then the classified weights are continued to be classified in a manner of multiplying a common factor by a power of 2.

For example, taking an 8 bit fixed point as an example, there are 256 cases where the weight is −128 to 127. Weights, of which the values are positive numbers and negative numbers having the same absolute value, are classified into one type, and there are 128 cases of classified weights. Then the 128 cases of classified weights are classified in a manner of multiplying a common factor by a power of 2. For example, weights 1, 2, 4, 8, 16, 32 and 64 are classified into one type, and a corresponding classification feature, i.e., the common factor, is 1; weights 3, 6, 12, 24, 48 and 96 are classified into another type, and the corresponding classification feature, i.e., the common factor, is 3. After classification, the weights are classified into 64 cases, so that the original 256 cases can be reduced to 64 cases.

Figure 3:
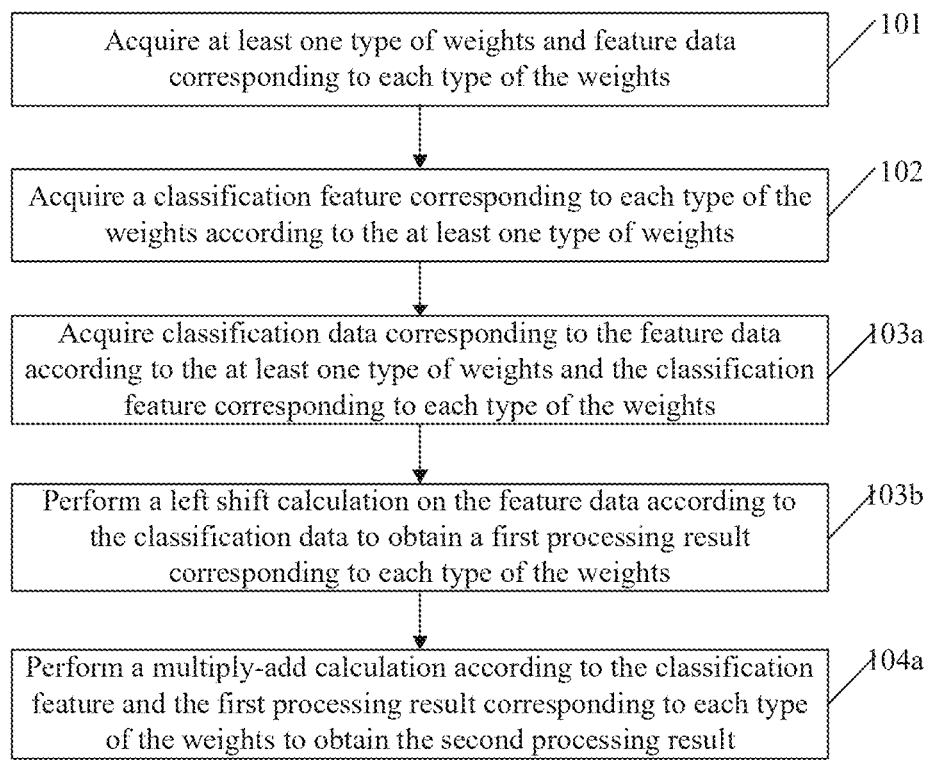
FIG. 3 is a schematic diagram III of an implementation procedure of a data processing method according to the embodiments of the present disclosure.

FIG. 3 is a schematic diagram III of an implementation procedure of a data processing method according to the embodiments of the present disclosure. As shown in FIG. 3, in the embodiments of the present disclosure, calculation is performed according to the at least one type of weights and the feature data corresponding to each type of the weights to obtain the first processing result corresponding to each type of the weights. That is, the data processing method implemented in operation 103 may include operations 103a, 103b and 104a.

In operation 103a, classification data corresponding to the feature data is acquired according to the at least one type of weights and the classification feature corresponding to each type of the weights.

In the embodiments of the present disclosure, after the weights and the classification features are acquired, classification data corresponding to the feature data may be acquired according to the at least one type of weights and the classification feature corresponding to each type of the weights.

For example, if the values of one type of weights are 1 and 4, and the corresponding feature data is 1 and 2 respectively; the weight values of another type of weights are 6 and −12, and the corresponding feature data are 3 and 4 respectively, then the weights can be converted into $1=1*2^0$, $4=1*2^2$, $6=3*2^1$ and $12=3*2^2$ in a manner of multiplying a common factor by a power of 2. The classification feature, i.e., the common factor, of one type of weights 1 and 4 is 1, and the classification data, i.e., the exponent in the power of 2, corresponding to this type of weights 1 and 4 is 0 and 2 respectively. The classification feature, i.e., the common factor, corresponding to another type of weights 6 and −12 is 3, and the classification data, i.e., the exponent in the power of 2, corresponding to another type of weights 6 and −12 is 1 and 2, respectively.

In operation 103b, a left shift calculation is performed on the feature data according to the classification data to obtain the first processing result corresponding to each type of the weights.

In operation 104a, a multiply-add calculation is performed according to the classification feature and the first processing result corresponding to each type of the weights to obtain the second processing result.

For example, the values of one type of weights are 1 and 4, the corresponding feature data are 1 and 2 respectively, the corresponding classification data, i.e., the exponent in the power of 2, is 0 and 2 respectively, and the corresponding classification feature, i.e., the common factor, is 1. The values of the other type of weights are 6 and −12, the corresponding feature data are respectively 3 and 4, the corresponding classification data, i.e., the exponent in the power of 2, are respectively 1 and 2, and the corresponding classification feature, i.e., the common factor, is 3. The first processing result corresponding to the weights 1 and 4 is (1<0)+(2<2)=1+8=9, the first processing result corresponding to the weights 6 and 12 is (3<<1)−(4<<2)=6−16=−10, and then a multiply-add calculation is performed according to the classification features and the first processing results, that is, 9*1 is first calculated to obtain 9, then 10*3 is calculated to obtain 30, and then the two results are added to obtain the second processing result, i.e., 9+(−30)=−21.

Based on the description above, for example, taking an 8-bit fixed point as an example, there are 256 cases where the weight is −128 to 127. In the conventional art, weights and corresponding feature data are directly multiplied first and then added, therefore, 256 multiplications are required to obtain the second processing result. In order to reduce the calculation amount, in the embodiments of the present disclosure, all the weights are classified first to obtain 64 types of weights, then shifting and accumulating are performed according to the classified respective types of weights and the corresponding feature data to obtain first processing results corresponding to 64 types of weights, and then the first processing results and the corresponding classification features are multiplied first and then added. In this way, in the embodiments of the present disclosure, only 64 multiplications are required to obtain the second processing result. Therefore, the embodiments of the present disclosure can achieve the effect of effectively reducing the calculation amount.

Figure 4:
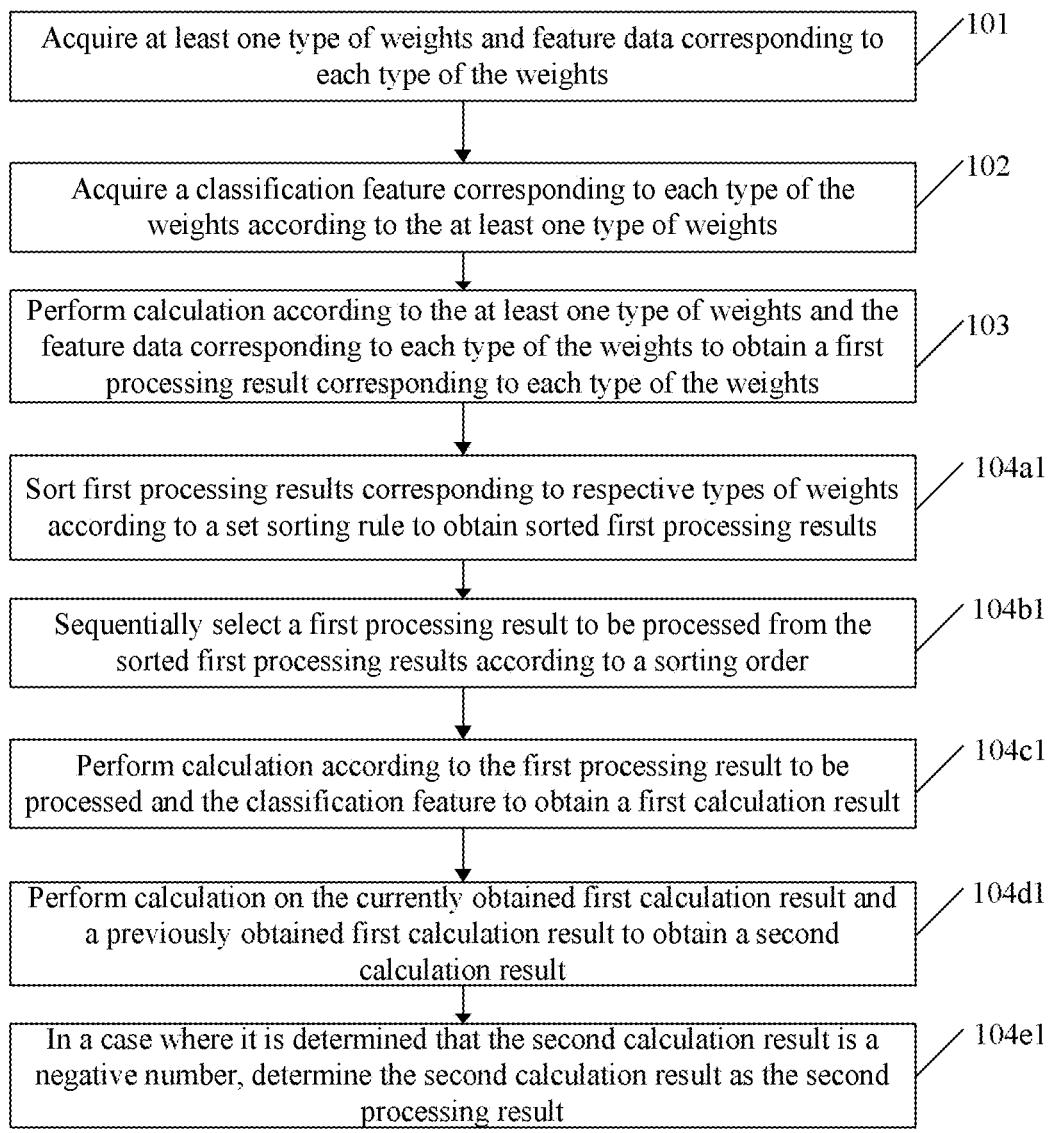
FIG. 4 is a schematic diagram IV of an implementation procedure of a data processing method according to the embodiments of the present disclosure.

FIG. 4 is a schematic diagram IV of an implementation procedure of a data processing method according to the embodiments of the present disclosure. As shown in FIG. 4, in the embodiments of the present disclosure, calculation is performed according to classification features and first processing results to obtain a second processing result, that is, the data processing method implemented in operation 104 may include operations 104a1, 104b1, 104c1, 104d1 and 104e1.

In operation 104a1, first processing results corresponding to respective types of weights are sorted according to a set sorting rule to obtain sorted first processing results.

In the embodiments of the present disclosure, after the first processing results corresponding to the respective types of weights are acquired, first processing results corresponding to the respective types of weights are sorted according to a set sorting rule to obtain sorted first processing results.

Here, if a corresponding first processing result is obtained for each type of the weights, first processing results corresponding to respective types of weights are sorted, i.e., the obtained first processing results are sorted. That is to say, the number of first processing results is the same as the number of types of weights.

It should be noted that, before the first processing results corresponding to respective types of weights are sorted according to the set sorting rule to obtain the sorted first processing results, in the embodiments of the present disclosure, the weights need to be pre-processed first according to operations 101a to 101c. The specific pre-processing is described as follows. Firstly, the positive and negative numerical values of the weights are recognized, wherein weights of which the values are positive numbers are classified into one type and weights of which the values are negative numbers are classified into another type, so that the screened weights may be classified into two types according to positive numbers and negative numbers. The two types of weights are further classified respectively in a manner of multiplying a common factor by a power of 2 to obtain multiple types of weights and first processing results corresponding to respective types of weights. Then, first processing results corresponding to respective types of weights are sorted according to a preset sorting rule to obtain sorted first processing results corresponding to the respective types of weights.

Here, the sorting rule may be that first processing results of which the values are positive numbers are placed in the front of the sorting result and first processing results of which the values are negative numbers are placed in the back of the sorting result. The operation that the first processing results corresponding to the respective types of weights are sorted according to the sorting rule to obtain the sorted first processing results may include: firstly, identifying whether the value of the first processing result is a positive number or a negative number, classifying, according to whether the value of the first processing result is a positive number or a negative number, the first processing results into first processing results of which the values are positive numbers and first processing results of which the values are negative numbers, then sorting the first processing results of which the values are positive numbers to the front, sorting the first processing results of which the values are negative numbers to the back of the sorting result, i.e., behind the first processing results of which the values are positive numbers. In this way, when performing calculation on the second processing result, it is convenient to calculate the first processing results of which the values are positive numbers, and then calculate the first processing results of which the values are positive numbers. The first processing results, of which the values are positive numbers, in the front of the sorting result may be sorted sequentially, and may also be sorted arbitrarily, as long as they are calculated before the first processing results of which the values are negative numbers. The first processing results, of which the values are negative numbers, in the back of the sorting result may be sorted arbitrarily, and may also be sorted in an ascending order in order to further reduce the calculation amount.

In operation 104b1, first processing results to be processed are sequentially selected from the sorted first processing results according to a sorting order.

It should be noted that, the sorting rule is that first processing results of which the values are positive numbers are placed in the front of the sorting result and first processing results of which the values are negative numbers are sorted behind the first processing results of which the values are positive numbers. In the embodiments of the present disclosure, sequentially selecting, according to the sorting order, the first processing results to be processed may be first selecting first processing results of which the values are positive numbers and which are placed in the front of the sorting result, and after all the first processing results of which the values are positive numbers have been selected for calculation, selecting first processing results corresponding to the negative weights and placed in the back of the sorting result to perform calculation.

In operation 104c1, calculation is performed according to the first processing result to be processed and the classification feature to obtain a first calculation result.

In operation 104d1, calculation is performed on the currently obtained first calculation result and a previously obtained first calculation result to obtain a second calculation result.

In operation 104e1, in a case where it is determined that the second calculation result is a negative number, the second calculation result is determined as the second processing result.

In the embodiments of the present disclosure, after the first processing results to be processed are selected, calculation is performed according to the first processing result to be processed and the classification feature to obtain the first calculation result. Calculation is performed on the currently obtained first calculation result and the previously obtained first calculation result to obtain a second calculation result, and then it is determined whether the second calculation result is a negative number. If the second calculation result is a negative number, it can be predicted according to the sorting order that the next selected first processing result should also be a negative number, in this case, the next selected calculation process is stopped, and the current second calculation result is directly used as the second processing result. If the second calculation result is a positive number, a next first processing result to be processed is continuously selected and calculated to obtain a second calculation result, and it is determined again whether the second calculation result is a negative number, and the rest process can be done in the same manner, until it is determined that the second calculation result is a negative number or calculation of the last first processing result in the sorting order is completed.

For example, if the sorted first processing results are A, B, C, and D, and the corresponding classification features are respectively A1, B1, C1 and D1, then A*A1 is firstly calculated, it is determined whether A*A1 is a negative number. If the second calculation result A*A1 is a negative number, the second calculation result A*A1 is directly used as the second processing result. If the second calculation result A*A1 is a positive number, B*B1 is calculated, then calculation is performed on the currently obtained first calculation result B*B1 and the previously obtained first calculation result A*A1 to obtain a second calculation result A*A1+B*B1, and it is determined whether the second calculation result A*A1+B*B1 is a negative number. If the second calculation result A*A1+B*B1 is a negative number, the second calculation result A*A1+B*B1 is directly used as the second processing result. If the second calculation result A*A1+B*B1 is a positive number, C*C1 is calculated, then calculation is performed on the currently obtained first calculation result C*C1 and the previously obtained first calculation result A*A1+B*B1 to obtain a second calculation result A*A1+B*B1+C*C1, and it is determined again whether the second calculated result A*A1+B*B1+C*C1 is a negative number. The rest process can be done in the same manner, until it is determined that the second calculation result is a negative number or the last first processing result D in the sorting order is calculated.

It should be noted that, for deep neural network calculation, as long as the second processing result is a negative number, the rectified linear unit (ReLU) activation functions are all regarded as a zero output. Based on the description above, it can be seen that, the embodiments of the present disclosure improve the whole calculation process. First, all weights are classified into two types according to positive numbers and negative numbers, then, the two types of weights are reclassified according to a classification rule such as multiplying a common factor by a power of 2. In a case where weight values corresponding to one type of weights are all negative numbers, the first processing results calculated based on the weight values are all negative numbers. In a case where weight values corresponding to one type of weights are all positive numbers, the first processing results calculated based on the weight values are positive numbers. Based on this fact, first processing results corresponding to respective types of weights are sorted, positive numbers are placed in the front of the sorting order and negative numbers are placed behind the positive numbers in the sorting order. The weights are sequentially selected according to the sorting order. In a case where it is determined that the second calculation result is a negative number, the subsequent calculation process should also be a negative number, and the calculation can be terminated, so that the purpose of terminating the convolution calculation in advance can be achieved, thereby reducing the calculation amount and the calculation power consumption, and improving the energy efficiency ratio.

Figure 5:
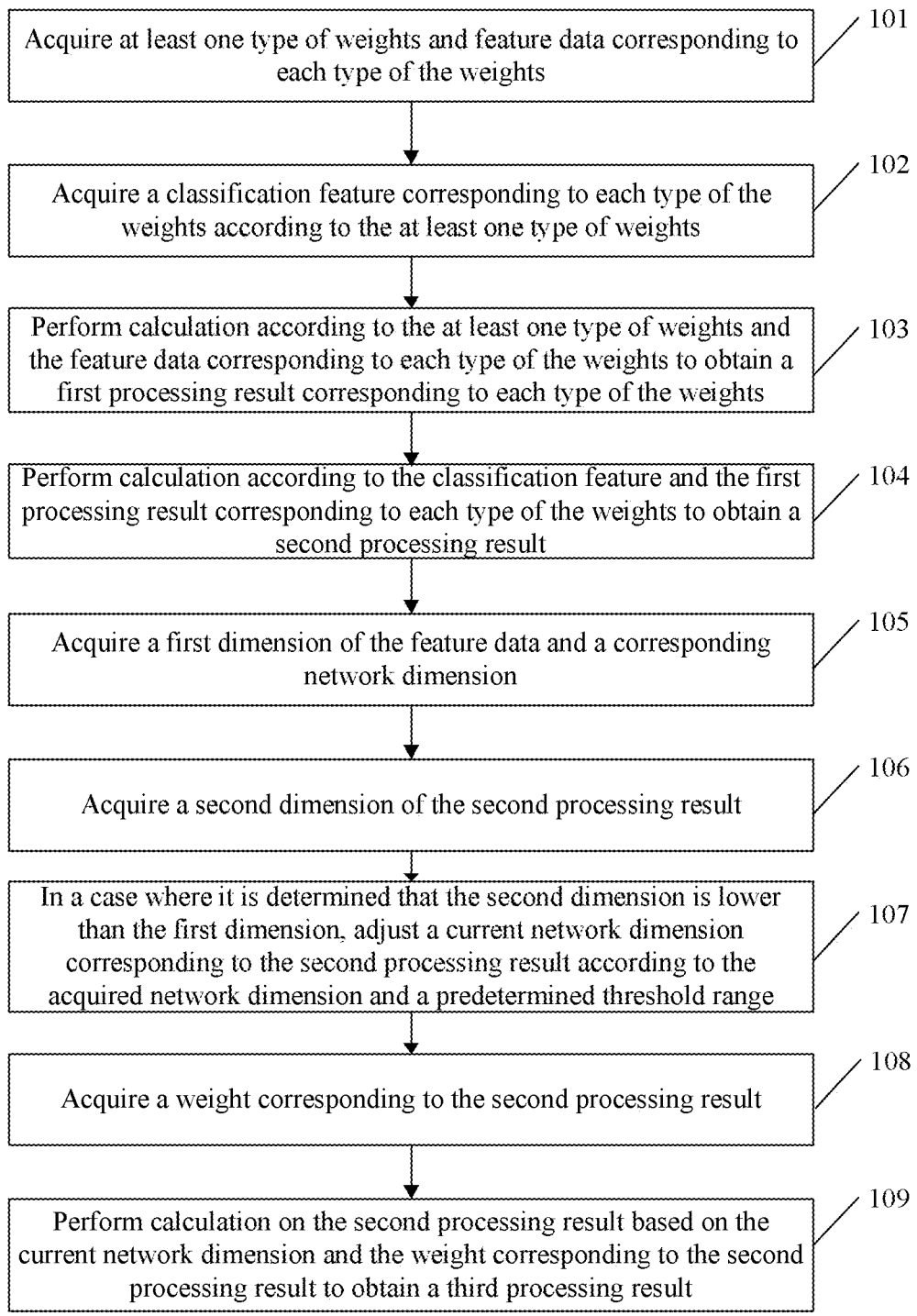
FIG. 5 is a schematic diagram V of an implementation procedure of a data processing method according to the embodiments of the present disclosure.

FIG. 5 is a schematic diagram V of an implementation procedure of a data processing method according to the embodiments of the present disclosure. As shown in FIG. 5, in the embodiments of the present disclosure, after calculation is performed according to the classification feature and the first processing result corresponding to each type of the weights corresponding to each type of the weights to obtain the second processing result, that is, after operation 104 is performed, the data processing method may further include the following operations 105 to 109.

In operation 105, a first dimension of the feature data and a corresponding network dimension are acquired.

In the embodiments of the present disclosure, the first dimension represents an actually required network model for calculation according to the weights and the feature data, and the network dimension represents a network model planned to be assigned for the calculation of the weights and the feature data.

In operation 106, a second dimension of the second processing result is acquired.

In the embodiments of the present disclosure, in order to further ensure calculation resources corresponding to the second processing result, in the embodiments of the present disclosure, there is a need to acquire the first dimension corresponding to current feature data and the second dimension corresponding to the second processing result.

In operation 107, in a case where it is determined that the second dimension is lower than the first dimension, the current network dimension corresponding to the second processing result is adjusted according to the acquired network dimension and a predetermined threshold range.

In the embodiments of the present disclosure, after the second processing result is acquired and before next-layer calculation is performed, it needs to be determined whether the second dimension is lower than the first dimension. If the second dimension is lower than the first dimension, it represents that processing next-layer calculation according to the network dimension corresponding to the current layer significantly wastes calculation resources. If the second dimension is not lower than the first dimension, it represents that processing the next-layer calculation according to the network dimension corresponding to the current layer does not waste resources, that is, the current network dimension corresponding to the second processing result does not need to be adjusted. Therefore, in the embodiments of the present disclosure, a predetermined threshold range is set, and a current network dimension corresponding to the second processing result is adjusted according to the network dimension and the predetermined threshold range, thereby avoiding the waste of resources.

In operation 108, the weight corresponding to the second processing result is acquired.

In operation 109, calculation is performed on the second processing result based on the current network dimension and the weight corresponding to the second processing result to obtain a third processing result.

In the embodiments of the present disclosure, after a current network dimension is obtained, calculation is performed on the second processing result according to the weight corresponding to the second processing result to obtain a third processing result. In this way, during a calculation process, once it is found that the network dimension of the calculation reduces, the current network dimension can be adjusted in real time, thereby realizing the maximum utilization of calculation resources.

Figure 6:
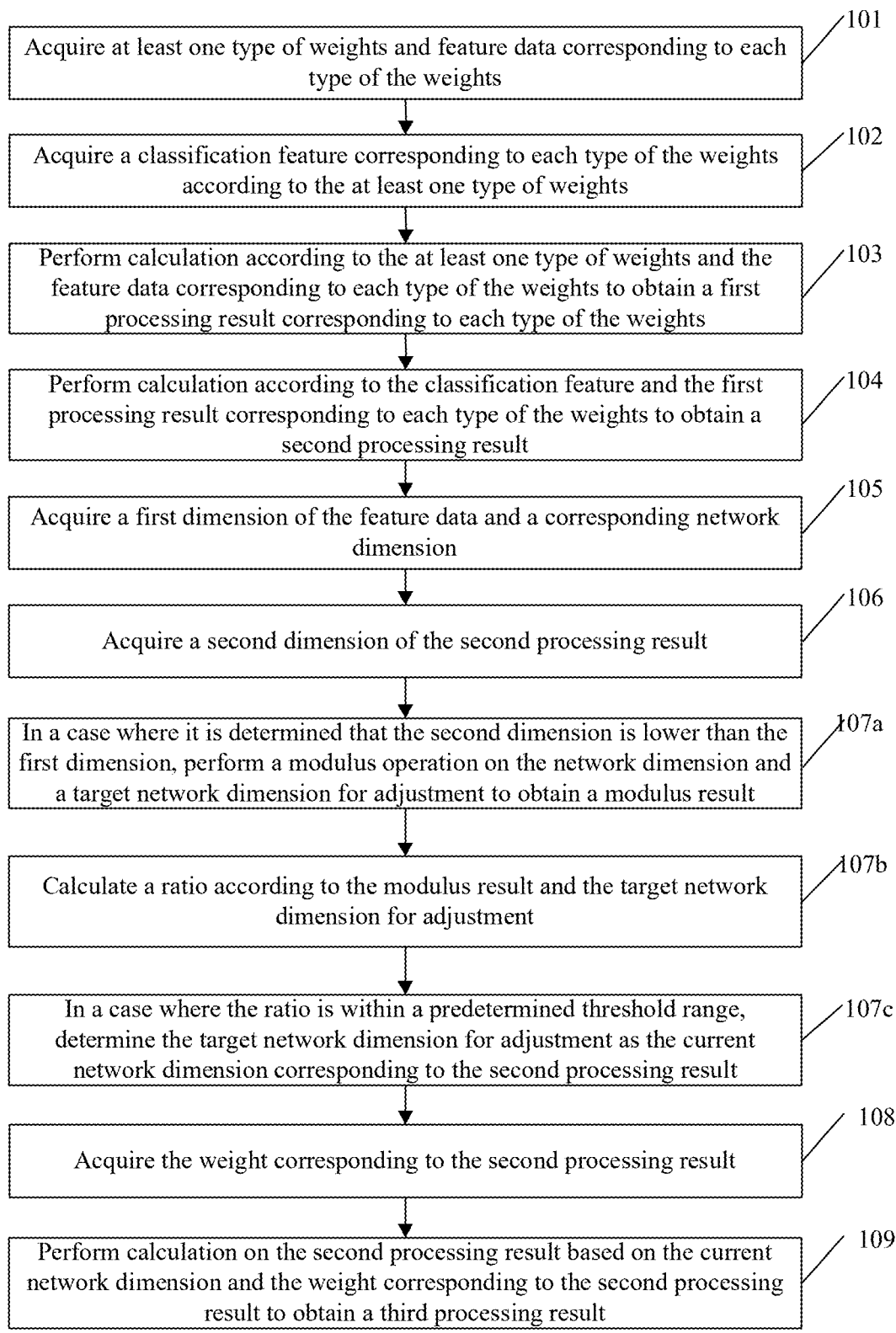
FIG. 6 is a schematic diagram VI of an implementation procedure of a data processing method according to the embodiments of the present disclosure.

FIG. 6 is a schematic diagram VI of an implementation procedure of a data processing method according to the embodiments of the present disclosure. As shown in FIG. 6, in the embodiments of the present disclosure, in a case where it is determined that the second dimension is lower than the first dimension, the current dimension corresponding to the second processing result is adjusted according to the second dimension and the predetermined threshold range, that is, the implementation of the operation 107 in the data processing method may further include operations 107a, 107b and 107c.

In operation 107a, in a case where it is determined that the second dimension is lower than the first dimension, a modulus operation is performed on the network dimension and a target network dimension for adjustment to obtain a modulus result.

In the embodiments of the present disclosure, in a case where it is determined that the second dimension is lower than the first dimension, i.e., the current network dimension needs to be adjusted, a modulus operation is performed on the network dimension and the target network dimension for adjustment to obtain a modulus result.

For example, assuming that the network dimension is 18 and the target network dimension for adjustment is 16, a modulus result obtained by performing a modulus operation on the dimensions is 2.

In operation 107b, a ratio is calculated according to the modulus result and the target network dimension for adjustment.

In the embodiments of the present disclosure, after the modulus result is obtained, a ratio is calculated according to the modulus result and the target network dimension for adjustment.

For example, assuming that the network dimension is 18 and the target network dimension for adjustment is 16, a modulus result obtained by performing a modulus operation on the dimensions is 2, and a ratio of the modulus result to the target network dimension for adjustment is 2/16=1/8.

In operation 107c, in a case where the ratio is within a predetermined threshold range, the target network dimension for adjustment is determined as the current network dimension corresponding to the second processing result.

In the embodiments of the present disclosure, assuming that the predetermined threshold range is from 0 to 1/6, and based on the example above, it can be obtained that the ratio 1/8 is within the predetermined threshold range, and the target network dimension for adjustment 16 is determined as the current network dimension corresponding to the second processing result.

In the embodiments of the present disclosure, at least one type of weights and feature data corresponding to each type of the weights are acquired, a classification feature corresponding to each type of the weights is acquired according to the at least one type of weights, calculation is performed according to the at least one type of weights and the feature data corresponding to each type of the weights to obtain a first processing result corresponding to each type of the weights, and calculation is performed according to the classification feature and the first processing result corresponding to each type of the weights to obtain a second processing result. In this way, weights are first classified to obtain classification features, and then feature data is calculated according to the classification features, so that a large amount of weights can be analyzed, sorted and classified into a relatively small number of weights, thereby effectively reducing the calculation amount.

Embodiment II

Based on the same inventive concept of embodiment I, the data processing method above is applied to a neural network. For better understanding of the embodiments of the present disclosure, a convolutional neural network (CNN) will be briefly described below.

The DNN includes a CNN and a recurrent neural network (RNN) which generally includes an input layer, at least one hidden layer, and an output layer.

The CNN is a multi-layered neural network, each layer consisting of a plurality of two-dimensional planes, and each plane consisting of a plurality of independent neurons. The CNN typically consists of a convolutional layer, a pooling layer, and a full connection (FC) layer. The convolutional layer generates a feature map of input data by means of a liner convolution kernel and a nonlinear activation function. The convolution kernel repeatedly performs a convolution with a different region of the input data, and then outputs same by means of a nonlinear function. The pooling layer is usually an average pooling layer or a maximal pooling layer, and this layer is used for finding an average value or a maximum value of a certain region of a feature map obtained from the previous layer. All elements of an input section in the FC layer are connected to output neurons, and each output element is obtained by multiplying all input elements by their respective weights and then performing summation on the multiplication results.

Figure 7:
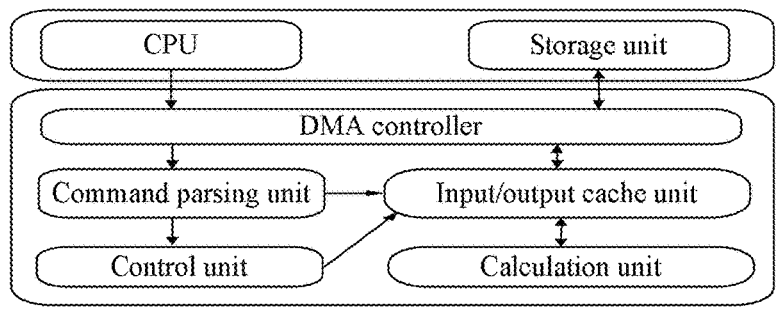
FIG. 7 is a schematic structural diagram of hardware architecture of a neural network according to the embodiments of the present disclosure.

FIG. 7 is a schematic structural diagram of hardware architecture of a neural network according to the embodiments of the present disclosure. As shown in FIG. 7, the hardware architecture of the neural network includes a central processing unit (CPU), a storage unit, a direct memory access (DMA) controller, a command parsing unit, a control unit, an input/output cache unit, and a calculation unit. The CPU is configured to send a control command to the DMA controller. The storage unit is configured to store the feature data and weight of the neural network, and a calculation result of the calculation unit. The storage unit can be an external double data rate SDRAM access memory (DDR) or an on-chip random access memory (RAM). The DMA controller is configured to receive a control command for convolution calculation from the CPU, the command carrying a start address and an end address. The DMA controller is configured to store, from the storage unit into the input/output cache unit, the feature data and weights stored in an address section identified by the start address and the end address, and at the same time, send a command to the command parsing unit. Alternatively, the DMA controller is configured to receive the control command from the CPU for storing a calculation result, and store the calculation result obtained by the calculation unit into the storage unit from the input/output cache unit. The command parsing unit is configured to receive a command from the DMA controller, parse the command to obtain the content of the command, and send to the control unit the content obtained by parsing the command. The control unit is configured to receive the content obtained by the command parsing unit, and send the command to the input/output cache unit according to the content obtained by the command parsing unit. The input/output cache unit is configured to receive a command from the control unit, and prepare feature data and weights to be calculated for the calculation unit according to the command of the control unit. Alternatively, the input/output cache unit is configured to store the feature data and weights to be calculated by the calculation unit and a calculation result obtained by the calculation unit. The input/output cache unit may be an on-chip dynamic random access memory (DRAM) or a register array. The input/output cache unit includes two parts. One part is used for caching weights and feature data. In order to reduce the capacity of the cached data, the cache size, the number of channels of each layer and the corresponding convolution kernel size can be associated. For example, if the convolution kernel size is 3*3, data of 64 channels may be cached; and if the convolution kernel is 7*7, data more than 64 channels may be cached. The other part of the cache is used for storing the weights and feature data to be calculated, and outputting the weights and feature data to the calculation unit. The calculation unit is configured to receive feature data and weights from the input/output cache unit, and complete a convolution calculation according to the feature data and the weights to obtain a second processing result. In a deep neural network, a convolution operation needs to be performed first, and then FC multiply-add operation, ReLU activation function and pooling processing are performed in the FC. Therefore, in addition to completing the convolution operation, the calculation unit in the embodiments of the present disclosure can also be used for completing the multiply-add operation, the ReLU activation function and the pooling processing of the FC. Since the embodiments of the present disclosure relates to the improvement of the convolution calculation in the calculation unit to reduce the calculation amount, the process that the calculation unit performs convolution calculation is described in details below.

Figure 8:
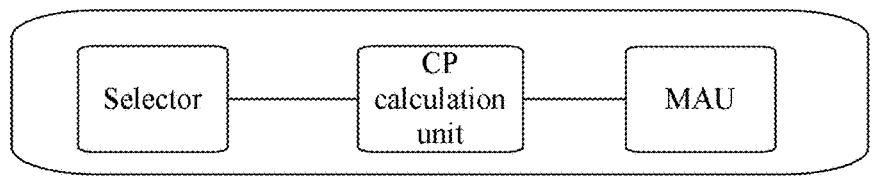
FIG. 8 is a schematic structural diagram of a calculation unit according to the embodiments of the present disclosure.

FIG. 8 is a schematic structural diagram of a calculation unit according to the embodiments of the present disclosure. As shown in FIG. 8, the calculation unit includes a selector, a classification processor (CP) calculation unit, and a multiply-add unit (MAU).

The selector is configured to receive the feature data and weights outputted from the input/output cache unit, select the corresponding weights and feature data from the feature data and the weights according to a weight indicator and corresponding location index information, and output the weights and the feature data to the CP calculation unit. The CP calculation unit is configured to select the feature data and weights outputted by the selector, perform a shift calculation on the feature data and the weights, and input first processing results and the classification features to the MAU. The MAU is configured to receive the first processing results and the classification features outputted by the CP calculation unit, and multiply and add the first processing results and the classification features to obtain the second processing result.

Figure 9:
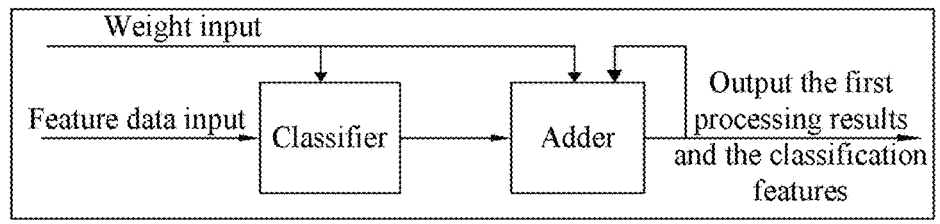
FIG. 9 is a schematic structural diagram of a classification processor (CP) calculation unit in the calculation unit according to the embodiments of the present disclosure.

FIG. 9 is a schematic structural diagram of the CP calculation unit in the calculation unit according to the embodiments of the present disclosure. As shown in FIG. 9, the CP calculation unit includes a classifier and an adder.

The classifier is configured to receive the weight and the feature data outputted by the selector, classify the weight to obtain the classification feature and the classification data, and input the classification feature, the classification data, and the feature data to the adder.

The adder is configured to receive the classification feature, the classification data and the feature data which are outputted from the classifier, perform a shift addition operation on the feature data according to the classification data to obtain first processing results, and then input the first processing results and the classification features to the MAU. In a case where the value of the weight is a negative number, a calculation, executed by the adder, corresponding to the weight of which the value is a negative number is adding a negative number, i.e., a subtraction calculation.

Figure 10:
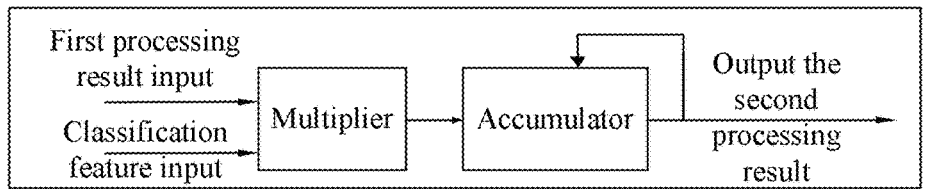
FIG. 10 is a schematic diagram of the structure in which one CP calculation unit in the calculation unit corresponds to one multiply-add unit (MAU) according to the embodiments of the present disclosure.
Figure 11:
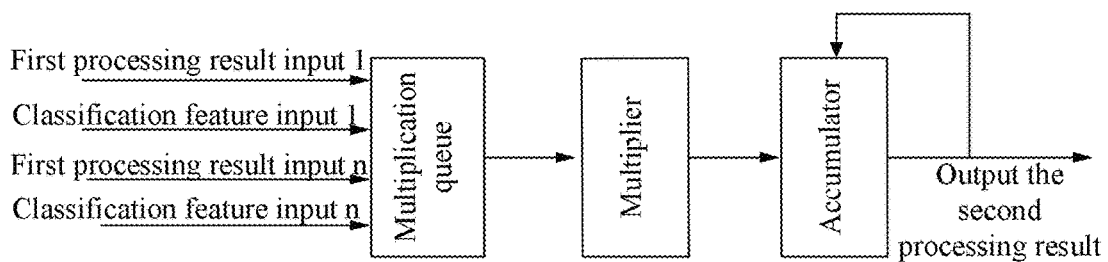
FIG. 11 is a schematic diagram of the structure in which one CP calculation unit in the calculation unit corresponds to multiple MAUs according to the embodiments of the present disclosure.

The MAU is configured to receive the first processing results and the classification features which are outputted from the adder, and first perform multiplication calculation on the first processing results and the classification features, and then perform accumulation calculation on same, so as to output a second processing result. The MAU can correspond to one or more CP calculation units. FIG. 10 is a schematic diagram of the structure in which one CP calculation unit in the calculation unit corresponds to one multiply-add unit (MAU) according to the embodiments of the present disclosure. As shown in FIG. 10, the MAU includes a multiplier and an accumulator. The CP calculation unit sequentially outputs first processing results corresponding to respective types of weights and the corresponding classification features to the MAU. The multiplier first multiplies the classification features corresponding to the first processing results of the first two types of weights, and outputs the obtained two corresponding multiplication results to the accumulator. The accumulator then sums the two multiplication results. Then, the multiplier performs a multiplication operation on the classification feature corresponding to the first processing result of the third type of weights and outputs the obtained multiplication result to the accumulator. Then, the accumulator accumulates the current multiplication result to the previous accumulation result, until the first processing result corresponding to the last type of weights and the corresponding classification feature are multiplied and then accumulated, and uses the obtained accumulation result as the second processing result. FIG. 11 is a schematic diagram of the structure in which one CP calculation unit in the calculation unit corresponds to multiple MAUs according to the embodiments of the present disclosure. As shown in FIG. 11, a multiplier queue is added before the multiplier to implement a routing function from a plurality of CP calculation units to one multiplier. This design can effectively increase the frequency of usage of the multiplier and further reduce the number of usage of the multiplier.

Figure 12:
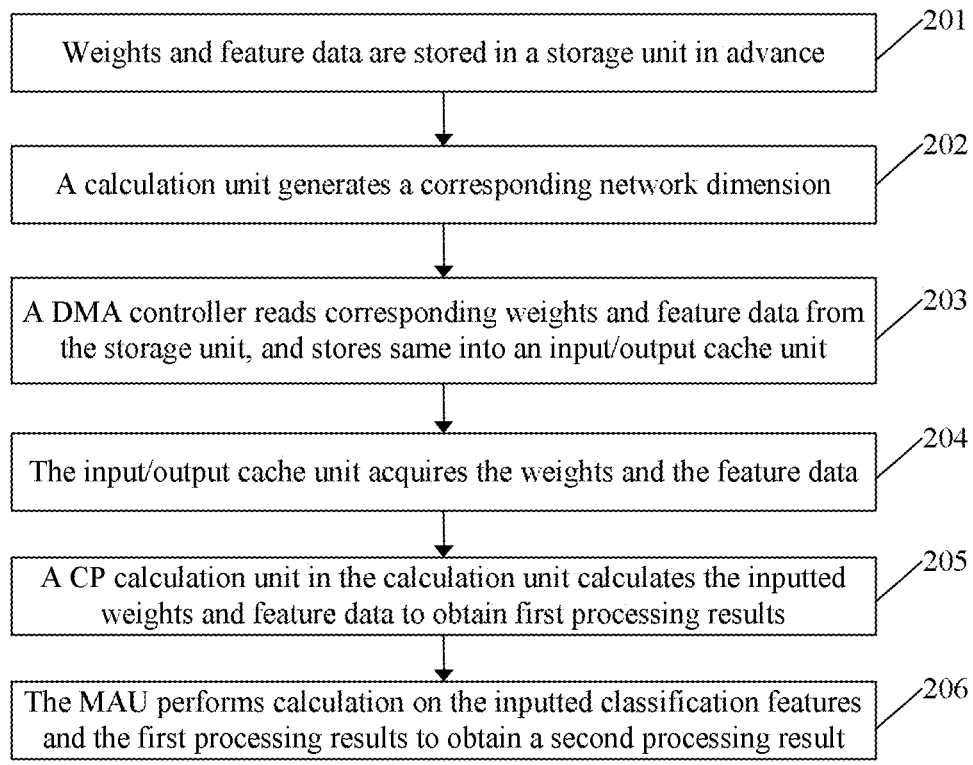
FIG. 12 is a schematic diagram VII of an implementation procedure of a data processing method according to the embodiments of the present disclosure.

Based on the description above, FIG. 12 is a schematic diagram VII of an implementation procedure of a data processing method according to the embodiments of the present disclosure. As shown in FIG. 12, in order to better describe the data processing method provided by the embodiments of the present disclosure, the data processing method may be applied to the calculation unit of the hardware architecture of the neural network. The data processing method implemented by the embodiments of the present disclosure may include operations 201 to 206.

In operation 201, the weights and feature data are stored in the storage unit in advance.

It should be noted that, for the classification data, the positive numbers may be stored first, and then the negative numbers are stored, so as to facilitate the subsequent termination of the multiply-add operation in advance. With regard to data with a weight of 0, since a convolution operation result is still 0, the data with the weight of 0 is discarded and does not participate in calculation, that is, neither storage nor reading is required for the weight of 0 in a storage unit, thereby saving storage resources and data read/write bandwidths, improving the resource processing efficiency, and further achieving the effect of supporting a sparse operation.

In operation 202, the calculation unit generates a corresponding network dimension.

It should be noted that, for the calculation unit, since different network models correspond to different network dimensions, such as 300*300 and 416*416, and for different network models, the sizes of dimensions supported by the network models may also be inconsistent, such as 1*1, 3*3, 5*5, 7*7, and so on; therefore, the calculation unit in the embodiments of the present disclosure is designed to have a flexible and scalable structure, that is, in a case where the dimensions corresponding to different network models are different, the calculation unit may be matched to the corresponding dimension of the corresponding network structure model, thereby maximally utilizing calculation resources.

Figure 13:
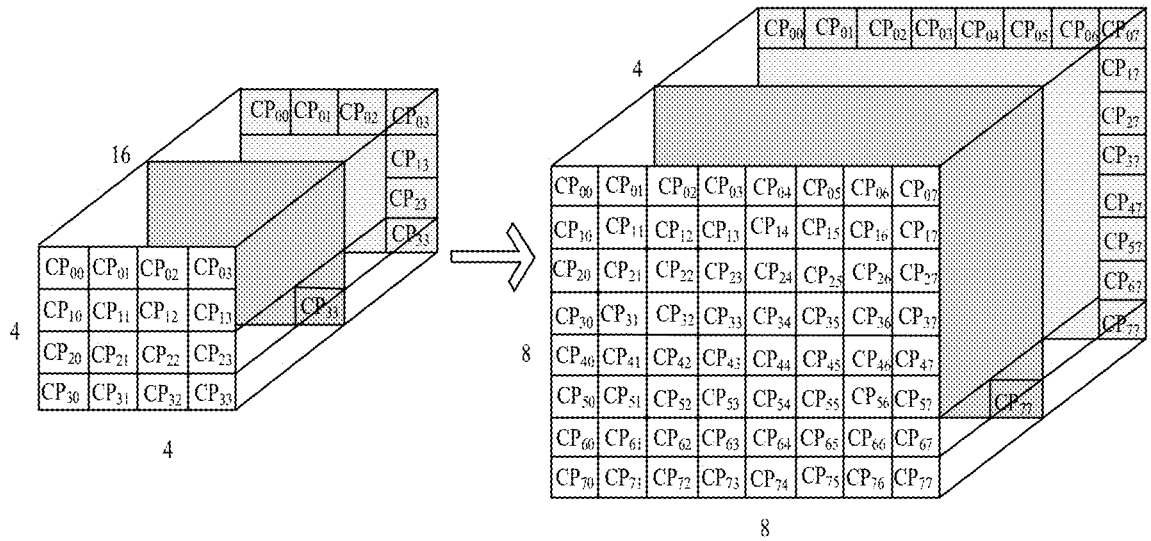
FIG. 13 is a schematic diagram of dimension matching of the calculation unit according to the embodiments of the present disclosure.

FIG. 13 is a schematic diagram of dimension matching of the calculation unit according to the embodiments of the present disclosure. As shown in FIG. 13, if a convolution kernel is 1*1 or 3*3, or a feature picture is 4*4 or less, a network dimension may be changed to the dimension shown on the left of FIG. 13, and if the convolution kernel is larger than 3*3, or the feature picture is larger than 4*4, the network dimension may be changed to the dimension shown on the right of FIG. 13.

In the embodiments of the present disclosure, when the control unit sends, to the calculation unit, a dimension command for adapting a current neural network model, the calculation unit generates, according to the command, a corresponding hardware structure model, i.e., a network dimension corresponding to the layer calculation. Specifically, the calculation unit may acquire a first dimension of the feature data and a corresponding network dimension, acquire a second dimension of a second processing result, adjust, in a case where it is determined that the second dimension is lower than the first dimension, a current network dimension corresponding to the second processing result according to the acquired network dimension and a predetermined threshold range, acquire a weight corresponding to the second processing result, and perform calculation on the second processing result based on the current network dimension and the weight corresponding to the second processing result to obtain a third processing result.

The data processing method for determining the current network dimension may include the following operations. In a case where it is determined that the second dimension is lower than the first dimension, a modulus operation is performed on the network dimension and a target network dimension for adjustment to obtain a modulus result. A ratio is calculated according to the modulus result and the target network dimension for adjustment. In a case where the ratio is within a predetermined threshold range, the target network dimension for adjustment is determined as the current network dimension corresponding to the second processing result.

In operation 203, the DMA controller reads corresponding weights and feature data from the storage unit, and stores same into the input/output cache unit.

In the embodiments of the present disclosure, the CPU sends a command to the DMA controller, and according to the sent command, the DMA controller outputs, to the input/output cache unit, the weights and feature data which are read from the storage unit.

It should be noted that, after the processing of a certain stage, the CPU is informed of the current processing progress in the form of an interrupt. The control unit issues a corresponding command to the input/output cache unit according to the current processing progress. The input/output cache unit outputs a command to the calculation unit, and prepares, for the calculation unit, weights and feature data to be calculated. The calculation unit executes a corresponding operation according to the commands, for example, after the convolution calculation is completed, a full connection needs to be calculated, and the calculation unit and the cache unit perform the matching and full-connection operations according to the commands.

In operation 204, the input/output cache unit acquires weights and feature data.

In the embodiments of the present disclosure, the cache unit needs to acquire location index information corresponding to the weight, and indexes corresponding feature data according to the location index information corresponding to the weight. For example, assuming that a weight value A1 is numbered as 100 at an original location corresponding to a filter, then the feature data at the location can be indexed according to the location number 100 corresponding to the weight value A1.

In operation 205, the CP calculation unit in the calculation unit calculates the inputted weights and feature data to obtain first processing results.

In the embodiments of the present disclosure, after the weights and feature data are acquired, the input/output cache unit outputs the weights and the feature data to the calculation unit, and the CP calculation unit in the calculation unit calculates the inputted weights and feature data, so as to acquire the first processing results.

Here, the CP calculation unit first accumulates the feature data corresponding to the same type of weights according to the classification features corresponding to the weights, and after the accumulation of the data corresponding to the same type of weights is completed, the accumulator is reset, and the accumulation of the data corresponding to the next type of weights is performed until all the data is processed completely.

It should be noted that if the weights are positive numbers, the CP calculation unit performs addition; and if the weights are negative numbers, the CP calculation unit performs subtraction.

For example, if the weight values of one type of weights are 6, 12, −24, 48, and the corresponding feature data are 2, 6, 8, and 3 respectively, then the classification feature, i.e., the factor, corresponding to the weights is 3, and the corresponding classification data, i.e., the exponents in the power of 2, are 1, 2, 3, and 4 respectively, then the first processing result corresponding to this type of weights is $(2<<1)+(6<<2)-(8<<3)+(3<<4)=4+24-64+48=12$.

In operation 206, the MAU performs calculation on the inputted classification features and the first processing results to obtain the second processing result.

In the embodiments of the present disclosure, after being output to the MAU, the plurality of CP calculation results are converted into serial data streams and sent to the multiplier module, and after multiplication operations are completed, accumulation operation is performed on data corresponding to different types of weights.

Figure 14:
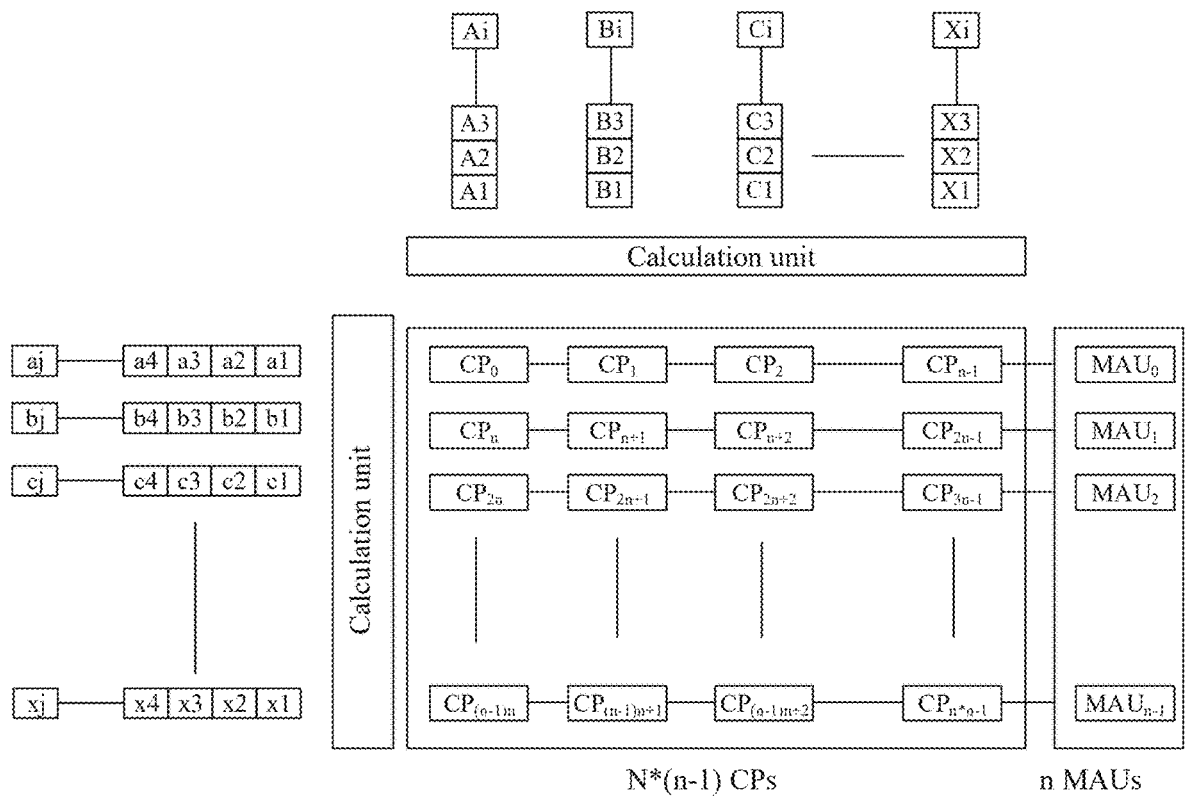
FIG. 14 is a schematic diagram of a calculation structure in the calculation unit according to the embodiments of the present disclosure.

FIG. 14 is a schematic diagram of a calculation structure in the calculation unit according to the embodiments of the present disclosure. As shown in FIG. 14, the calculation structure in the calculation unit consists of feature data, weights, a CP array and an MAU array. The calculation process of the calculation unit is as follows. The weights and the feature data are output to a corresponding CP calculation unit by means of a selector. The CP calculation unit completes accumulation processing for data corresponding to each type of the weights and outputs a first processing result and a classification feature to the MAU. The MAU performs multiply-add operation on the first processing results and the classification features to obtain the second processing result.

According to the embodiments of the present disclosure, first processing results are obtained by performing accumulation calculation on feature data according to the classification features, and then a multiply-add operation is performed on the first processing results and the classification features. In this way, an operation manner of performing addition first and then performing multiplication can effectively reduce the calculation amount.

Embodiment III

Figure 15:
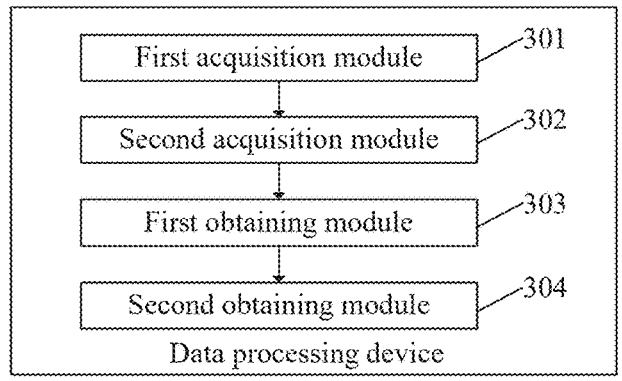
FIG. 15 is a schematic diagram of a data processing device according to the embodiments of the present disclosure.

Based on the same inventive concept of embodiment I and embodiment II, the embodiments of the present disclosure provide a data processing device. The calculation unit in the hardware architecture of the neural network in embodiment II may apply the data processing device. FIG. 15 is a schematic diagram of a data processing device according to the embodiments of the present disclosure. As shown in FIG. 15, the data processing device includes: a first acquisition module 301, configured to acquire a classification feature corresponding to each type of the weights according to the at least one type of weights; a second acquisition module 302, configured to acquire a classification feature corresponding to each type of the weights according to the at least one type of weights; a first obtaining module 303, configured to perform calculation according to the at least one type of weights and the feature data corresponding to each type of the weights to obtain a first processing result corresponding to each type of the weights; and a second obtaining module 304, configured to perform calculation according to the classification feature and the first processing result corresponding to each type of the weights to obtain a second processing result.

In some other embodiments, the first obtaining module 303 may be configured to: acquire historical weights; screen the historical weights according to a set screening condition to obtain screened weights; and classify the screened weights according to a set classification rule to obtain the at least one type of weights.

In some other embodiments, the first obtaining module 303 may be configured to: acquire classification data corresponding to the feature data according to the at least one type of weights and the classification feature corresponding to each type of the weights; and perform calculation on the feature data according to the classification data to obtain the first processing result corresponding to each type of the weights.

In some other embodiments, the second obtaining module 304 may be configured to: sort first processing results corresponding to respective types of weights according to a set sorting rule to obtain sorted first processing results; according to an sorting order, sequentially select from the sorted first processing results a first processing result to be processed; perform calculation according to the classification feature and the first processing result to be processed to obtain a first calculation result; perform calculation on the currently obtained first calculation result and a previously obtained first calculation result to obtain a second calculation result; and determine, in a case where it is determined that the second calculation result is a negative number, the second calculation result as the second processing result.

In some other embodiments, the data processing device may be further configured to: after performing calculation according to the classification feature and the first processing result corresponding to each type of the weights to obtain the second processing result, acquire a first dimension of the feature data and a corresponding network dimension; acquire a second dimension of the second processing result; adjust, in a case where it is determined that the second dimension is lower than the first dimension, a current network dimension corresponding to the second processing result according to the acquired network dimension and a predetermined threshold range; acquire a weight corresponding to the second processing result; and perform calculation on the second processing result based on the current network dimension and the weight corresponding to the second processing result to obtain a third processing result.

In some other embodiments, the data processing device may be further configured to: perform, in a case where it is determined that the second dimension is lower than the first dimension, a modulus operation on the network dimension and a target network dimension for adjustment to obtain a modulus result; calculate a ratio according to the modulus result and the target network dimension for adjustment; and determine, in a case where the ratio is within a predetermined threshold range, the target network dimension for adjustment as the current network dimension corresponding to the second processing result.

In some other embodiments, the first obtaining module 303 may be further configured to: perform a left shift calculation on the feature data according to the classification data to obtain the first processing result corresponding to each type of the weights. Correspondingly, the second obtaining module 304 may be further configured to: perform multiply-add calculation according to the classification feature and the first processing result corresponding to each type of the weights to obtain the second processing result.

According to the embodiments of the present disclosure, the data processing device first performs an accumulation calculation on feature data according to classification features, and then performs a multiplication operation based on accumulation calculation results and the classification features. In this way, an operation manner of first adding and then multiplying can effectively reduce a calculation amount.

Embodiment IV

Figure 16:
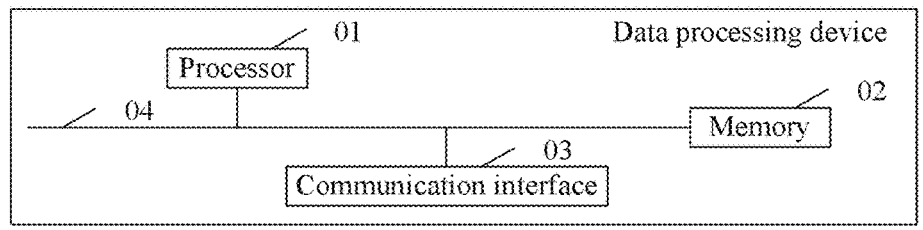
FIG. 16 is a schematic structural diagram of a data processing device according to the embodiments of the present disclosure.

Based on the same inventive concept of the embodiment I to the embodiment III, the embodiments of the present disclosure provides a data processing device. FIG. 16 is a schematic structural diagram of a data processing device according to the embodiments of the present disclosure. As shown in FIG. 16, the data processing device at least includes a processor 01, a memory 02 storing an instruction that is able to be executed by the processor 01, a communication interface 03, and a bus 04 for connecting the processor, the memory and the communications interface. When the instruction is executed, the processor implements the following operations: acquiring at least one type of weights and feature data corresponding to each type of the weights; acquiring a classification feature corresponding to each type of the weights according to the at least one type of weights; performing calculation according to the at least one type of weights and the feature data corresponding to each type of the weights to obtain a first processing result corresponding to each type of the weights; and performing calculation according to the classification feature and the first processing result corresponding to each type of the weights to obtain a second processing result.

In an exemplary embodiment, the first processor is further configured to execute a data processing program stored in the first memory, so as to implement the following operations: acquiring historical weights; screening the historical weights according to a set screening condition to obtain screened weights; and classifying the screened weights according to a set classification rule to obtain the at least one type of weights.

In an exemplary embodiment, the first processor is configured to execute a data processing program stored in the first memory, so as to implement the following operations: acquiring classification data corresponding to the feature data according to the at least one type of weights and the classification feature corresponding to each type of the weights; and performing calculation on the feature data according to the classification data to obtain a first processing result corresponding to each type of the weights.

In an exemplary embodiment, the first processor is configured to execute a data processing program stored in the first memory, so as to implement the following operations: sorting first processing results corresponding to respective types of weights according to a set sorting rule to obtain sorted first processing results; according to an sorting order, sequentially selecting from the sorted first processing results a first processing result to be processed; performing calculation according to the classification feature and the first processing result to be processed to obtain a first calculation result; performing calculation on the currently obtained first calculation result and a previously obtained first calculation result to obtain a second calculation result; and determining, in a case where it is determined that the second calculation result is a negative number, the second calculation result as the second processing result.

In an exemplary embodiment, the first processor is further configured to execute a data processing program stored in the first memory, so as to implement the following operations: after performing calculation according to the classification feature and the first processing result corresponding to each type of the weights to obtain the second processing result, acquiring a first dimension of the feature data and a corresponding network dimension; acquiring a second dimension of the second processing result; adjusting, in a case where it is determined that the second dimension is lower than the first dimension, a current network dimension corresponding to the second processing result according to the acquired network dimension and a predetermined threshold range; acquiring a weight corresponding to the second processing result; and performing calculation on the second processing result based on the current network dimension and the weight corresponding to the second processing result to obtain a third processing result.

In an exemplary embodiment, the first processor is configured to execute a data processing program stored in the first memory, so as to implement the following operations: performing, in a case where it is determined that the second dimension is lower than the first dimension, a modulus operation on the network dimension and a target network dimension for adjustment to obtain a modulus result; calculating a ratio according to the modulus result and the target network dimension for adjustment; and determining, in a case where the ratio is within a predetermined threshold range, the target network dimension for adjustment as the current network dimension corresponding to the second processing result.

In an exemplary embodiment, the first processor is configured to execute a data processing program stored in the first memory, so as to implement the following operations: performing a left shift calculation on the feature data according to the classification data to obtain the first processing result corresponding to each type of the weights; and performing multiply-add calculation according to the classification feature and the first processing result corresponding to each type of the weights to obtain the second processing result.

According to the embodiments of the present disclosure, the data processing device first performs an accumulation calculation on feature data according to classification features, and then performs a multiplication operation based on accumulation calculation results and the classification features. In this way, an operation manner of first adding and then multiplying can effectively reduce a calculation amount.

In practical application, the processor may be a central processing unit (CPU), a microprocessor unit (MPU), a digital signal processor (DSP), a field programmable gate array (FPGA), etc.

In addition, the components in the embodiments of the present disclosure may be integrated into one processing unit, or each of the units may exist alone physically, or two or more units are integrated into one unit. The integrated unit may be implemented in the form of hardware, and may also be implemented in the form of a software functional module.

If the integrated unit is implemented in the form of a software functional module and sold or used as an independent product, the integrated unit may be stored in a computer-readable storage medium. Based on this understanding, the substantial portions of the embodiments of the present disclosure, or the portions of the embodiments of the present disclosure making contributions upon the conventional art, or a part of or all of the embodiments of the present disclosure can be embodied in the form of software. The computer software product may be stored in a readable storage medium which includes a plurality of instructions for causing a computer device (which may be a personal computer, a server, a network device, or the like) to execute all or a part of the operations of the data processing method described in the embodiments of the present disclosure. The storage medium includes media that can store program codes such as a ferromagnetic random access memory (FRAM), a read-only memory (ROM), a programmable read-only memory (PROM), an erasable programmable read-only memory (EPROM), an electrically erasable programmable read-only memory (EEPROM), a flash memory, a magnetic surface memory, an optical disk and a compact disc read-only memory (CD-ROM), which is not limited in the embodiments of the present disclosure.

Based on the embodiments above, the embodiments of the present disclosure provide a computer-readable storage medium, on which a data processing program is stored. The data processing program, when being executed by a processor, causes the processor to implement the data processing method in one or more of the embodiments above.

Those having ordinary skill in the art shall understand that the embodiments of the present disclosure are able to be provided as a method, a system or a computer program product. Therefore, the present disclosure can adopt forms of a hardware embodiment, a software embodiment or embodiment combining software and hardware. Furthermore, the embodiments of the present disclosure can be implemented in a computer program product in a form of a computer-readable storage medium including computer-readable program codes (including, but is not limited to magnetic disk storage, the optical storage, and the like).

The present disclosure is described herein with reference to flowchart charts and/or block diagrams of methods, devices (systems), and computer program products according to the embodiments of the disclosure. It should be understood that each process and/or block and combinations of the processes and/or blocks of the flowcharts and/or the block diagrams may be implemented in the form of computer program instructions. These computer program instructions may be provided to a general purpose computer, a special purpose computer, an embedded processor or a processor of other programmable data processing device to form a machine, such that devices for implementing functions specified by one or more flows in the flowchart and/or one or more blocks in the block diagram may be generated by executing the instructions with the processor of the computer or other programmable data processing device.

The computer program instructions may also be stored into a computer-readable memory capable of guiding the computer or other programmable data processing equipment to work by specific means, so that the instructions stored into the computer-readable memory can be provided to produce a product of an instruction device. The instruction device is configured to achieve the functions specified in one or more processes in the flowchart and/or one or more blocks in the block diagram.

These computer program instructions can also be loaded onto the computer or the other programmable data processing device so that a series of operational operations are performed on the computer or the other programmable data processing device to create a computer implemented process so that the instructions executed on the computer or the other programmable data processing device provide operations for performing the functions specified in the flow(s) of the flowchart and/or the block(s) of the block diagram.

The above described are merely exemplary embodiments of the present disclosure, they are not intended to limit the scope of the present disclosure.

The invention claimed is:

1. A data processing method applied in a convolutional neural network, comprising performing convolution calculation on feature data and weights corresponding to respective feature data by the following operations performed by a data processing device comprising a calculation unit that comprises a plurality of classification processor (CP) calculation units and a multiply-add unit (MAU):
    classifying, by the plurality of CP calculation units, the weights into at least one type of weights and acquiring, by the plurality of CP calculation units, the feature data corresponding to each type of the weights, wherein the weights are classified according to a set classification rule comprising one of:
        weights, of which values are positive numbers and negative numbers having a same absolute value, are classified into one type, and then the weights of various types are further classified by converting the weights in a manner of multiplying a common factor by a power of 2 and classifying weights having the same common factor into one type;
        weights of which values are positive numbers are classified into one type and weights of which values are negative numbers are classified into another type, and then the weights of various types are further classified by converting the weights in a manner of multiplying a common factor by a power of 2 and classifying weights having the same common factor into one type; or,
        the weights are directly classified by converting the weights in a manner of multiplying a common factor by a power of 2 and classifying weights having the same common factor into one type;
    acquiring, by the plurality of CP calculation units, the common factor corresponding to each type of the weights;
    acquiring, by the plurality of CP calculation units according to the at least one type of weights and the common factor corresponding to each type of the weights, classification data corresponding to the feature data; and
    performing, by the plurality of CP calculation units, a left shift calculation on the respective feature data corresponding to each type of the weights according to the classification data corresponding to the respective feature data, and summing, by the plurality of CP calculation units, results of the left shift calculation to obtain a first processing result corresponding to each type of the weights, wherein the classification data is exponent in the power of 2; and performing, by the MAU comprising one multiplier and an accumulator, multiply-add calculation according to the common factor and the first processing result corresponding to each type of the weights to obtain a second processing result,
    wherein before performing, by the MAU comprising one multiplier and the accumulator, the multiply-add calculation according to the common factor and the first processing result corresponding to each type of the weights to obtain the second processing result, the method further comprises:
    implementing a routing function from the plurality of CP calculation units to the multiplier through a multiplier queue.

2. The data processing method according to claim 1, wherein before classifying, by the plurality of CP calculation units, the weights into the at least one type of weights, the data processing method further comprises the following operations performed by the data processing device:
    acquiring historical weights;
    screening the historical weights according to a set screening condition to obtain screened weights; and
    classifying the screened weights according to a set classification rule to obtain the at least one type of weights.

3. The data processing method according to claim 2, wherein performing, by the MAU comprising one multiplier and the accumulator, the multiply-add calculation according to the common factor and the first processing result corresponding to each type of the weights to obtain the second processing result comprises the following operations performed by the MAU:
    sorting first processing results corresponding to respective types of weights according to a set sorting rule to obtain sorted first processing results;
    according to a sorting order, sequentially selecting from the sorted first processing results a first processing result to be processed;
    performing calculation according to the common factor and the first processing result to be processed to obtain a first calculation result;
    performing calculation on the currently obtained first calculation result and a previously obtained first calculation result to obtain a second calculation result; and
    determining, in a case where it is determined that the second calculation result is a negative number, the second calculation result as the second processing result.

4. The data processing method according to claim 1, wherein after performing, by the MAU comprising one multiplier and the accumulator, the multiply-add calculation according to the common factor and the first processing result corresponding to each type of the weights to obtain the second processing result, the data processing method further comprises the following operations performed by the calculation unit:
    acquiring a first dimension of the feature data and a corresponding network dimension;
    acquiring a second dimension of the second processing result;
    adjusting, in a case where it is determined that the second dimension is lower than the first dimension, a current network dimension corresponding to the second processing result according to the acquired network dimension and a predetermined threshold range;
    acquiring a weight corresponding to the second processing result; and
    performing calculation on the second processing result based on the current network dimension and the weight corresponding to the second processing result to obtain a third processing result.

5. The data processing method according to claim 4, wherein adjusting, in a case where it is determined that the second dimension is lower than the first dimension, the current network dimension corresponding to the second processing result according to the acquired network dimension and the predetermined threshold range comprises the following operations:
    performing, in a case where it is determined that the second dimension is lower than the first dimension, a modulus operation on the network dimension and a target network dimension for adjustment to obtain a modulus result;
    calculating a ratio according to the modulus result and the target network dimension for adjustment; and
    determining, in a case where the ratio is within a predetermined threshold range, the target network dimension for adjustment as the current network dimension corresponding to the second processing result.

6. A data processing device applied in a convolutional neural network, comprising a calculation unit that comprises a plurality of classification processor (CP) calculation units and a multiply-add unit (MAU) and is configured to perform convolution calculation on feature data and weights corresponding to respective feature data, wherein:

the plurality of CP calculation units are configured to classify the weights into at least one type of weights and acquire the feature data corresponding to each type of the weights, wherein the weights are classified according to a set classification rule comprising one of:
weights, of which values are positive numbers and negative numbers having a same absolute value, are classified into one type, and then the weights of various types are further classified by converting the weights in a manner of multiplying a common factor by a power of 2 and classifying weights having the same common factor into one type;
weights of which values are positive numbers are classified into one type and weights of which values are negative numbers are classified into another type, and then the weights of various types are further classified by converting the weights in a manner of multiplying a common factor by a power of 2 and classifying weights having the same common factor into one type; or,
the weights are directly classified by converting the weights in a manner of multiplying a common factor by a power of 2 and classifying weights having the same common factor into one type;

the plurality of CP calculation units are configured to acquire the common factor corresponding to each type of the weights;

the plurality of CP calculation units are configured to acquire, according to the at least one type of weights and the common factor corresponding to each type of the weights, classification data corresponding to the feature data; and perform a left shift calculation on the respective feature data corresponding to each type of the weights according to the classification data corresponding to the respective feature data, and sum results of the left shift calculation to obtain a first processing result corresponding to each type of the weights, wherein the classification data is exponent in the power of 2;

a multiplier queue is provided to implement a routing function from the plurality of CP calculation units to the multiplier; and the MAU comprising one multiplier and an accumulator is configured to perform multiply-add calculation according to the common factor and the first processing result corresponding to each type of the weights to obtain a second processing result.

7. A non-transitory computer-readable storage medium applied in a convolutional neural network, on which a computer program is stored, wherein the computer program, when being executed by a data processing device comprising a calculation unit that comprises a plurality of classification processor (CP) calculation units and a multiply-add unit (MAU), causes the calculation unit to perform convolution calculation on feature data and weights corresponding to respective feature data by the following operations:

classifying, by the plurality of CP calculation units, the weights into at least one type of weights and acquiring, by the plurality of CP calculation units, the feature data corresponding to each type of the weights, wherein the weights are classified according to a set classification rule comprising one of:
weights, of which values are positive numbers and negative numbers having a same absolute value, are classified into one type, and then the weights of various types are further classified by converting the weights in a manner of multiplying a common factor by a power of 2 and classifying weights having the same common factor into one type;
weights of which values are positive numbers are classified into one type and weights of which values are negative numbers are classified into another type, and then the weights of various types are further classified by converting the weights in a manner of multiplying a common factor by a power of 2 and classifying weights having the same common factor into one type; or,
the weights are directly classified by converting the weights in a manner of multiplying a common factor by a power of 2 and classifying weights having the same common factor into one type;

acquiring, by the plurality of CP calculation units, the common factor corresponding to each type of the weights;

acquiring, by the plurality of CP calculation units according to the at least one type of weights and the common factor corresponding to each type of the weights, classification data corresponding to the feature data; and performing, by the plurality of CP calculation units, a left shift calculation on the respective feature data corresponding to each type of the weights according to the classification data corresponding to the respective feature data, and summing, by the plurality of CP calculation units, results of the left shift calculation to obtain a first processing result corresponding to each type of the weights, wherein the classification data is exponent in the power of 2; and performing, by the MAU comprising one multiplier and an accumulator, multiply-add calculation according to the common factor and the first processing result corresponding to each type of the weights to obtain a second processing result, wherein before performing, by the MAU comprising one multiplier and the accumulator, the multiply-add calculation according to the common factor and the first processing result corresponding to each type of the weights to obtain the second processing result, the data processing device is further caused to perform the following operations:

implementing a routing function from the plurality of CP calculation units to the multiplier through a multiplier queue.

8. The data processing device according to claim 6, wherein the data processing device is further configured to perform the following operations before classifying, by the plurality of CP calculation units, the weights into the at least one type of weights:
acquiring historical weights;
screening the historical weights according to a set screening condition to obtain screened weights; and
classifying the screened weights according to a set classification rule to obtain the at least one type of weights.

9. The data processing device according to claim 8, wherein the MAU, when performing the multiply-add calculation according to the common factor and the first processing result corresponding to each type of the weights to obtain the second processing result, is configured to perform the following operations:
sorting first processing results corresponding to respective types of weights according to a set sorting rule to obtain sorted first processing results;

according to a sorting order, sequentially selecting from the sorted first processing results a first processing result to be processed;

performing calculation according to the common factor and the first processing result to be processed to obtain a first calculation result;

performing calculation on the currently obtained first calculation result and a previously obtained first calculation result to obtain a second calculation result; and determining, in a case where it is determined that the second calculation result is a negative number, the second calculation result as the second processing result.

10. The data processing device according to claim 6, wherein the calculation unit is further configured to, after performing, by the MAU comprising one multiplier and the accumulator, the multiply-add calculation according to the common factor and the first processing result corresponding to each type of the weights to obtain the second processing result, execute the following operations:

acquiring a first dimension of the feature data and a corresponding network dimension;

acquiring a second dimension of the second processing result;

adjusting, in a case where it is determined that the second dimension is lower than the first dimension, a current network dimension corresponding to the second processing result according to the acquired network dimension and a predetermined threshold range;

acquiring a weight corresponding to the second processing result; and performing calculation on the second processing result based on the current network dimension and the weight corresponding to the second processing result to obtain a third processing result.

11. The data processing device according to claim 10, wherein adjusting, in a case where it is determined that the second dimension is lower than the first dimension, the current network dimension corresponding to the second processing result according to the acquired network dimension and the predetermined threshold range comprises the following operations:

performing, in a case where it is determined that the second dimension is lower than the first dimension, a modulus operation on the network dimension and a target network dimension for adjustment to obtain a modulus result;

calculating a ratio according to the modulus result and the target network dimension for adjustment; and determining, in a case where the ratio is within a predetermined threshold range, the target network dimension for adjustment as the current network dimension corresponding to the second processing result.

12. The non-transitory computer-readable storage medium according to claim 7, wherein the computer program, when being executed by the data processing device, further causes the data processing device to:

acquire historical weights;

screen the historical weights according to a set screening condition to obtain screened weights; and classify the screened weights according to a set classification rule to obtain the at least one type of weights.

13. The non-transitory computer-readable storage medium according to claim 12, wherein the computer program, when being executed by the MAU, causes the MAU to:

sort first processing results corresponding to respective types of weights according to a set sorting rule to obtain sorted first processing results;

according to a sorting order, sequentially select from the sorted first processing results a first processing result to be processed;

perform calculation according to the common factor and the first processing result to be processed to obtain a first calculation result;

perform calculation on the currently obtained first calculation result and a previously obtained first calculation result to obtain a second calculation result; and determine, in a case where it is determined that the second calculation result is a negative number, the second calculation result as the second processing result.

14. The non-transitory computer-readable storage medium according to claim 7, wherein the computer program, when being executed by the calculation unit, further causes the calculation unit to:

acquire a first dimension of the feature data and a corresponding network dimension;

acquire a second dimension of the second processing result;

adjust, in a case where it is determined that the second dimension is lower than the first dimension, a current network dimension corresponding to the second processing result according to the acquired network dimension and a predetermined threshold range;

acquire a weight corresponding to the second processing result; and perform calculation on the second processing result based on the current network dimension and the weight corresponding to the second processing result to obtain a third processing result.

15. The non-transitory computer-readable storage medium according to claim 14, wherein the computer program, when being executed by the calculation unit, causes the calculation unit to:

perform, in a case where it is determined that the second dimension is lower than the first dimension, a modulus operation on the network dimension and a target network dimension for adjustment to obtain a modulus result;

calculate a ratio according to the modulus result and the target network dimension for adjustment; and determine, in a case where the ratio is within a predetermined threshold range, the target network dimension for adjustment as the current network dimension corresponding to the second processing result.

* * * * *